(12) United States Patent
Moyer et al.

(10) Patent No.: US 6,751,724 B1
(45) Date of Patent: Jun. 15, 2004

(54) METHOD AND APPARATUS FOR INSTRUCTION FETCHING

(75) Inventors: William C. Moyer, Dripping Springs, TX (US); Jeffrey W. Scott, Austin, TX (US); James S. Thomas, Austin, TX (US); John H. Arends, Austin, TX (US); John J. Vaglica, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/552,118

(22) Filed: Apr. 19, 2000

(51) Int. Cl.[7] .................................................. G06F 9/30
(52) U.S. Cl. ....................................... 712/205; 712/210
(58) Field of Search ................................. 712/204, 205, 712/210, 225; 710/307, 65, 66

(56) References Cited

U.S. PATENT DOCUMENTS

| | | | |
|---|---|---|---|
| 4,633,437 A | | 12/1986 | Mothersole et al. |
| 5,459,847 A | * | 10/1995 | Okamura ..................... 711/213 |
| 5,530,825 A | * | 6/1996 | Black et al. ................. 711/213 |
| 5,596,740 A | * | 1/1997 | Quattromani et al. ....... 711/157 |
| 5,611,071 A | * | 3/1997 | Martinez, Jr. ................ 711/133 |
| 5,651,138 A | | 7/1997 | Le et al. ...................... 395/481 |
| 5,802,587 A | * | 9/1998 | Ishikawa et al. ............. 711/155 |
| 5,826,058 A | | 10/1998 | Hartvigsen et al. |
| 5,867,682 A | * | 2/1999 | Witt et al. ................... 712/210 |
| 5,978,908 A | * | 11/1999 | Cumming et al. ........... 712/240 |
| 6,336,182 B1 | * | 1/2002 | Derrick et al. .............. 712/204 |
| 6,393,549 B1 | * | 5/2002 | Tran et al. ................... 712/204 |
| 6,510,475 B1 | * | 1/2003 | Bennett ........................ 710/60 |

* cited by examiner

Primary Examiner—Henry W. H. Tsai
(74) Attorney, Agent, or Firm—Joanna G. Chiu; Mark D. Patrick (57) ABSTRACT

Embodiments of the present invention relate to instruction fetching in data processing systems. One aspect involves a data processor (202) to execute instructions and to fetch instructions from a memory (208) according to a fetch size. This data processor (202) comprises a first input (212) to receive instructions, control logic (402) to decode the instructions, and an instruction pipeline (400) coupled to the first input (212) and the control logic (400). The instruction pipeline (400) is responsive to a first signal (214) to set the fetch size to one of a first size and a second size. The data processor (202) therefore allows an instruction fetch policy to be altered based on the characteristics of an accessed device in order to achieve improved performance.

17 Claims, 7 Drawing Sheets

METHOD AND APPARATUS FOR INSTRUCTION FETCHING

FIELD OF THE INVENTION

This application relates generally to data processing systems, and more specifically, to instruction fetching in data processing systems.

RELATED ART

As data processing systems are becoming more widely used for a variety of applications, both speed and cost are becoming greater concerns. The goal in most designs is to reduce latency in order to improve speed and performance. For example, in many data processing systems, a central processing unit (CPU) increases instruction fetching efficiency by incorporating a number of instruction buffers and a wider data bus to memory. As the width of these instruction buffers and data buses increases, the bandwidth of data transfers increases, thus allowing for a more efficient CPU pipeline utilization. For example, a CPU may utilize a 32-bit bus which allows for 32-bit accesses. Therefore, for a processor having a 16-bit instruction length, two instructions may be accessed each cycle from a device that supports 32-bit accesses. However, in such data processing systems, a need exists to be able to also access instructions from devices, such as memories, supporting only 16-bit accesses. Devices having 16-bit access ports are generally cheaper and easier to manufacture than devices having 32-bit access ports since smaller port sizes allow for smaller packages. In the case of these 16-bit devices, the increased bandwidth offered by the 32-bit data busses internal to the data processing system may present a performance penalty rather than a performance improvement when the CPU requests a pair of 16-bit instructions since the 16-bit device is not capable of supplying a pair of instructions with the same latency as a single instruction.

Figure 1:
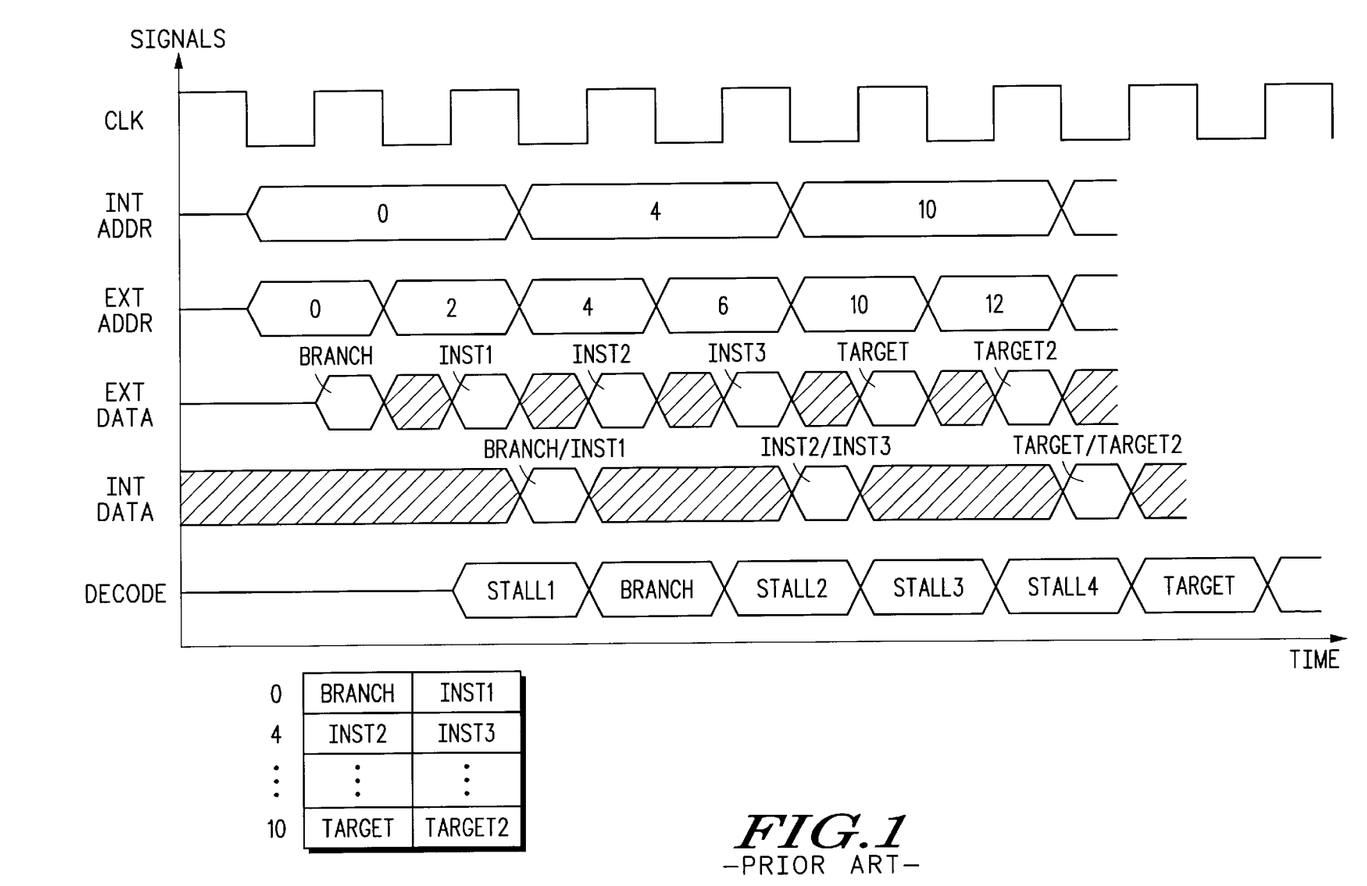
FIG. 1 illustrates, in timing diagram form, a prior art operation of a pipelined central processing unit.

For example, FIG. 1 illustrates, in timing diagram form, the operation of a data processing system having a CPU utilizing 16-bit instructions coupled to a 32-bit internal data bus, a 16-bit external data bus, and a 16-bit external memory device. In this case, the CPU requests and fetches two instructions during each instruction access, since the internal data bus supports 32-bit fetches. In many sequences of instructions, though, greater pipeline stalls occur due to the fact that two instructions must be accessed before returning the fetched instructions to the CPU. For example, as illustrated in FIG. 1, a pair of instructions located at addresses 0 and 2 are accessed during the first two cycles by placing address 0 on the internal address bus (INT ADDR) and requesting a 32-bit fetch. The requested address corresponds to an external 16-bit memory, thus two 16-bit fetches must be performed (to address 0 and 2 respectively) in order to satisfy the CPU's request. In the instruction stream illustrated in the table of FIG. 1, the first two instructions stored at addresses 0 and 2, are branch (BRANCH) and instruction 1 (INST 1), respectively. Once the branch and instruction 1 are placed on the external data bus (EXT DATA) by the device being accessed, they are provided to the CPU as shown in FIG. 1 via the internal data bus (INT DATA). Therefore, the CPU does not begin to decode the branch instruction until both the branch and instruction 1 have been fetched from the accessed device.

While the branch is in the decode stage of the CPU pipeline, an access of the next two instructions has already been initiated, as illustrated by INT ADDR receiving address 4, indicating that address 4 has been accessed. No data is returned to the CPU until both instructions 2 and 3 (INST 2 and INST 3) corresponding to addresses 4 and 6, respectively, are placed on the external data bus. However, prior to completing the access of addresses 4 and 6, the branch was decoded and a target address generated. Because the branch instruction causes a change of flow in the instruction execution stream, the prefetched instructions 2 and 3 (located at addresses 4 and 6 respectively) will be discarded, and are not executed. Since the fetches of addresses 4 and 6 were already initiated, the CPU is stalled until both instructions 2 and 3 are fetched. Therefore, the fetch of instructions 2 and 3 introduces stall 2 into the CPU pipeline. Only after the access of instructions 2 and 3 can the access of the target instruction (TARGET) of the branch located at address 10 begin. Furthermore, the target of the branch is not received until after both the target and target 2 instructions (at addresses 10 and 12) have been placed on the external data bus and returned to the CPU, since a pair of instructions was requested, thus introducing stall 4 into the CPU pipeline.

The introduction of stalls 1 through 4 into the CPU pipeline results in increased latency and decreased performance of the data processing system. FIG. 1 illustrates one example of the latencies introduced into a data processing system; however, similar latencies arise in many data processing systems utilizing similar instruction fetches, especially when attempting to interface a data processing device with an external device having a smaller access port than the width of the data processing device's internal data bus. Therefore, a need exists for improved instruction fetching in order to reduce latency and achieve a more efficient data processing system.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Therefore, the signals described herein may be designed as positive or negative logic, where negative logic can be indicated by a bar over the signal name. In the case of negative logic, the signals are active low where the logically true state corresponds to a logic level zero. Brackets are used to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value.

Also as used herein, a word refers to a 32-bit bitlength. Therefore, a doubleword refers to 64 bits, a halfword to 16 bits, and a byte to 8 bits. However, alternate embodiments may use different bit length indications. For example, in some embodiments, a word may refer to 16 bits or to 64 bits. Therefore, these labels are not meant to limit the scope of the embodiments described herein, but are provided to help illustrate the embodiments.

One aspect of the embodiments described herein involves a data processor to execute instructions and to fetch instructions from a memory according to an instruction fetch size. This data processor comprises a first input to receive instructions, control logic to decode the instructions, and an instruction pipeline coupled to the first input and the control logic. The instruction pipeline is responsive to a first signal to set the fetch size to one of a first size and a second size. The data processor therefore allows an prefetch policy to be altered based on the characteristics of an accessed device in order to achieve improved performance.

Figure 2:
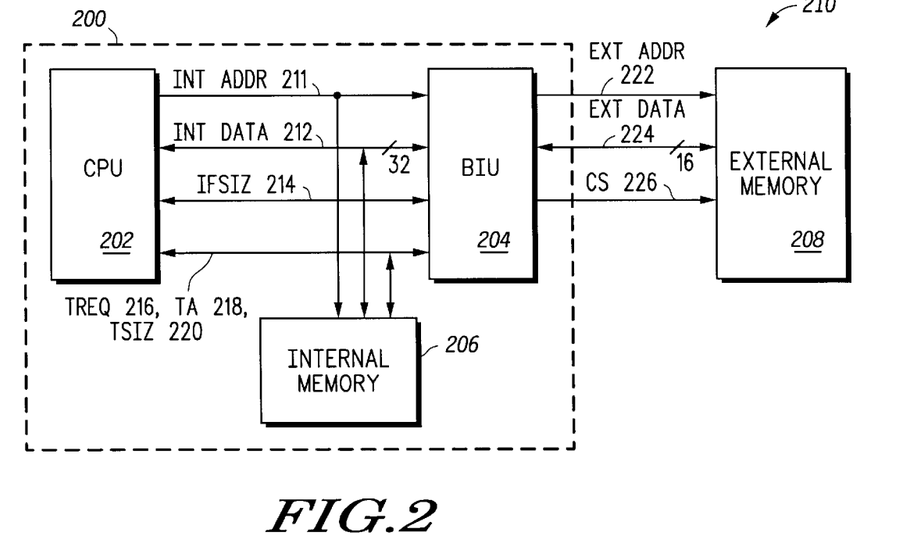
FIG. 2 illustrates, in block diagram form, a data processing system in accordance with one embodiment of the present invention.

FIG. 2 illustrates, in block diagram form, data processing system 210 in accordance with one embodiment of the present invention. Data processing system 210 includes data processing Integrated Circuit (IC) 200 and external memory 208. Data processing IC 200 includes data processor 202 coupled to bus interface unit (BIU) 204 and internal memory 206 via an internal address bus (INT ADDR) 211, an internal data bus (INT DATA) 212, and address control signals (TREQ 216, TA 218, and TSIZ 220). Data processor 202 may be a central processing unit, a microprocessor, microcontroller etc. In one embodiment of the present invention, data processor 202 is a central processing unit (CPU). CPU 202 also receives an instruction fetch size signal (IFSIZ) 214, from BIU 204. BIU 204 is coupled to external memory 208 via an external address bus (EXT ADDR) 222, an external data bus (EXT DATA) 224, and a chip select signal (CS) 226. Data processing IC 200 may be a single IC, chip, or device, or may be a portion of a larger IC, chip, or device. In some embodiments, external memory 208 may also be located in the same integrated circuit as data processing IC 200. Also, in alternate embodiments, BIU 204 may be included as a part of external memory 208, or as a separate unit outside of data processing IC 200.

In one embodiment, INT DATA 212 is a 32-bit data bus capable of accessing two 16-bit instructions in one cycle. Generally, internal memory 206, coupled to INT DATA 212 would also be a 32-bit memory which would allow the accessing of the two 16-bit instructions simultaneously. Accessing two instructions each cycle increases the bandwidth and performance of data processing IC 200. Therefore, internal memories are generally designed to handle the same bandwidth as the internal data busses allow.

In some embodiments, however, data processing IC 200 may be interfaced to a 16-bit device, such as external memory 208, via a 16-bit bus, such as EXT DATA 224. In this case, BIU 204 would generally require two access cycles in order to access a full 32 bits (two 16-bit instructions) from external memory 208. The fact that two accesses are required to fill the bandwidth of the 32-bit internal data bus slows down performance of data processing IC 200. To address this situation, IFSIZ 214 is used to control the instruction prefetch policy of CPU 202 in order to fetch one instruction per cycle when prefetching instructions from external memory 208, thus improving performance.

Although the above example uses specific bus widths and devices, alternate embodiments may incur similar problems while using different parameters. For example, a similar problem occurs when an internal bus of 64 bits is used to access multiple 16-bit or 32-bit instructions from a device that is less than a 64-bit device. That is, the problem generally occurs when attempting to fetch multiple instructions simultaneously from a device with a smaller data bus width than the defined instruction fetch width. Therefore, this can occur in most cases where two different bus widths are interfaced.

Figure 3:
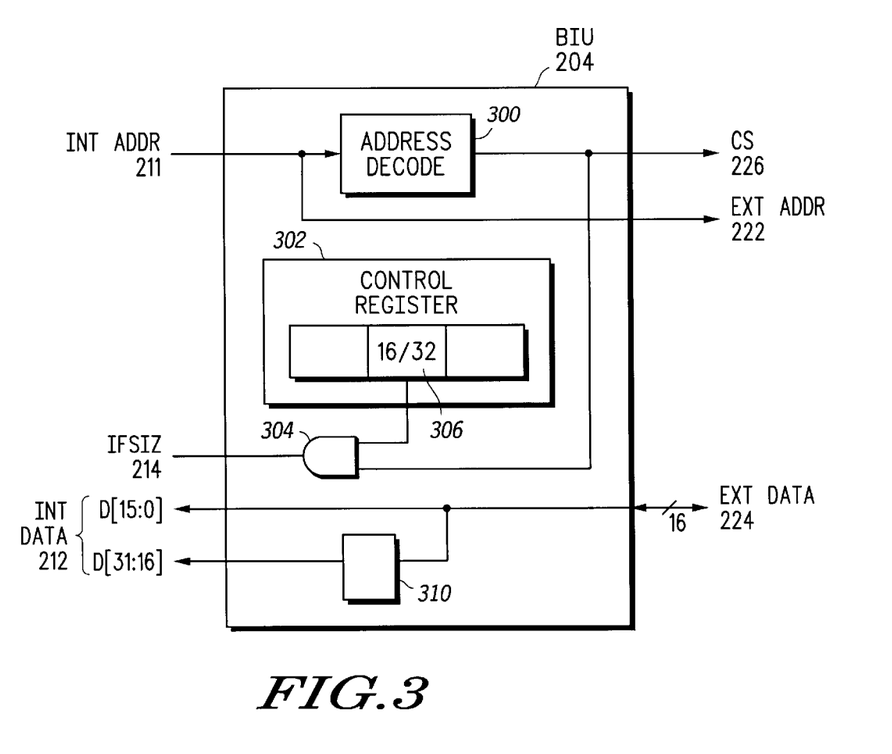
FIG. 3 illustrates, in block diagram form, one embodiment of the bus interface unit of the data processing system of FIG. 2.

FIG. 3 illustrates, in block diagram form, one embodiment of BIU 204. BIU 204 includes address decode 300 and control register(s) 302. INT ADDR 211 is an input to address decode 300 and is coupled to EXT ADDR 222 through BIU 204. Address decode 300 also provides the chip select signal, CS 226, as an output of BIU 204 to select the device to be accessed. Control register(s) 302 includes a memory width field, such as memory width field 306, that corresponds to the width of the device controlled by CS 226.

For example, if only one external memory is accessed, such as external memory 208, only one chip select signal would be needed with its corresponding memory width field 306. However, data processing IC 200 may include other memories or data processing system 210 may include other external memories or devices, each having their own chip selects, thus requiring BIU 204 to have selection circuitry to select the proper chip select to be sent out as CS 226 to the corresponding memory or device to be accessed. Furthermore, each external memory or device would have a corresponding memory width field such as memory width field 306 within control registers 302 to indicate the access width of each device. In one embodiment, these memory width fields may be a single bit to indicate either a 16-bit or 32-bit device. However, alternate embodiments may use more bits as needed to differentiate among devices of varying access widths.

BIU 204 also couples EXT DATA 224 to INT DATA 212. BIU 204 includes a holding register 310, coupled to EXT DATA 224 and to the upper 16 bits of INT DATA 212, D[31:16]. If a 16-bit device is being accessed via EXT DATA 224, BIU 204 provides the data from EXT DATA 224 onto the lower 16 bits of INT DATA 212, D[15:0]. For a 32-bit fetch request made by the CPU, holding register 310 is used to capture the first 16-bits of data provided by EXT DATA 224, while a subsequent 16-bit access retrieves the remaining 16-bits (of the 32-bit request) from EXT DATA 224, and on completion of the second 16-bit transfer, INT DATA 212 is driven with the entire 32-bit requested data, with INT DATA 212 D[31:16] driven with the content of the holding register 310, and INT DATA 212 D[15:0] driven from EXT DATA 224. If a 32-bit device is being accessed via a 32-bit external data bus, then all 32 bits are provided to INT DATA 212. Alternatively, BIU 204 may couple the data from EXT DATA 224 onto the upper 16 bits of INT DATA 212, D[31:16]. BIU 204 also includes AND gate 304 which produces the output signal, IFSIZ 214. When an external device is to be accessed, AND gate 304 receives as an input the chip select signal of the selected external device and its corresponding memory width field. IFSIZ 214 is therefore at one state if the selected device is a 16-bit device and at a second state if the selected device is a 32-bit device. For example, IFSIZ 214 may be asserted when a 16-bit device is being accessed and negated when a 32-bit device is being accessed. However, it should be appreciated that other control mechanisms may be used to generate IFSIZ 214.

Although the above example illustrates IFSIZ 214 as corresponding to an external memory or device, alternate embodiments may use a similar signal when an internal memory such as internal memory 206 is 16-bit memory. In this case, a signal similar to IFSIZ 214 may be generated to indicate to CPU 202 the memory width of the internal memory being accessed. The signal could be generated from BIU 204 or from other internal circuitry storing access information corresponding to the internal memories. For example, internal control registers may be used that are found outside BIU 204.

Figure 4:
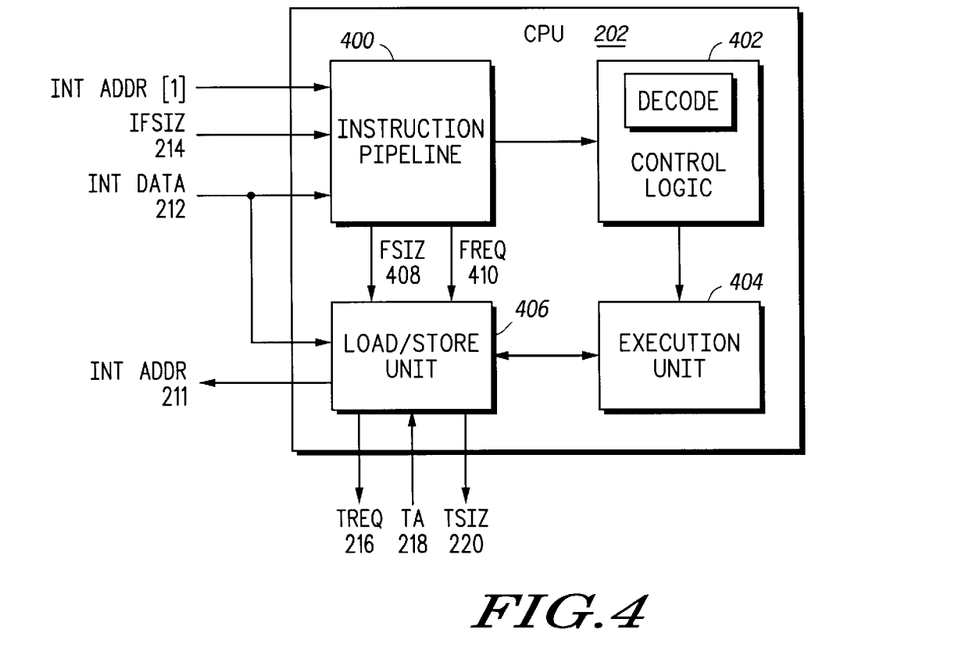
FIG. 4 illustrates, in block diagram form, one embodiment of central processing unit of FIG. 2.

FIG. 4 illustrates, in block diagram form, one embodiment of CPU 202 of FIG. 2. CPU 202 includes instruction pipeline 400 coupled to control logic 402 and load/store unit 406. Control logic 402 is coupled to execution unit 404 which is bi-directionally coupled to load/store unit 406. Instruction pipeline 400 receives IFSIZ 214 from BIU 204 and provides fetch size (FSIZ) 408 and fetch request (FREQ) 410 to load/store unit 406. Load/store unit 406 provides addresses via INT ADDR 211 to BIU 204 and outputs or receives various address control signals in order to properly interface with a device on the bus. For example, in one embodiment, load/store unit 406 outputs TREQ 216 to initiate a transfer request and TSIZ 220 to indicate a transfer size, and receives as an input TA 218 to indicate a transfer acknowledge. These signals are used in accessing both data and instructions. Load/store unit 406 is also coupled to INT DATA 212 in order to send or receive data.

Figure 5:
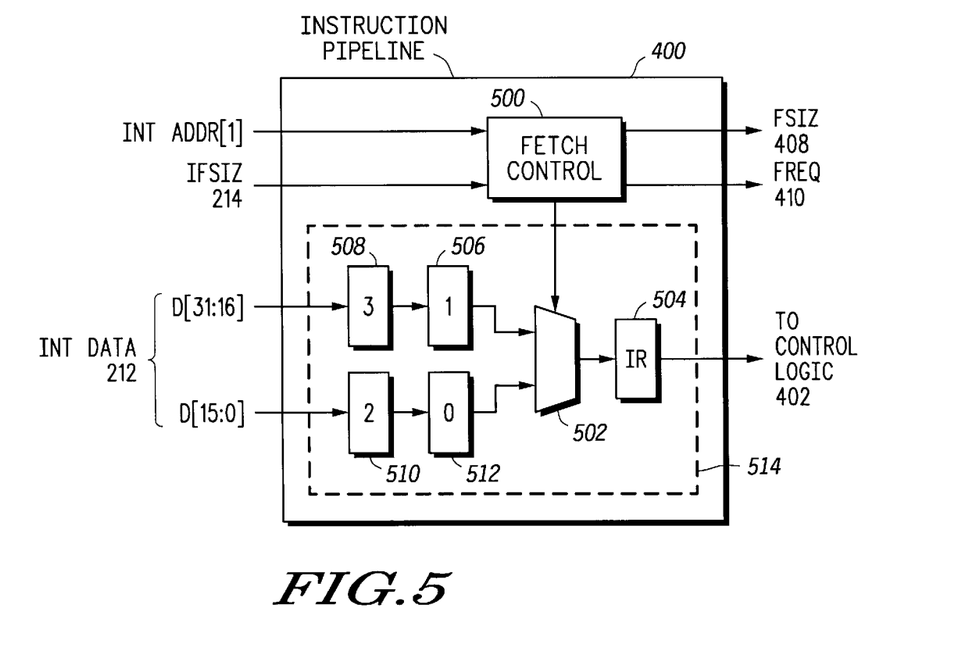
FIG. 5 illustrates, in block diagram form, one embodiment of the instruction pipeline of FIG. 4.

FIG. 5 illustrates, in block diagram form, one embodiment of instruction pipeline 400. Instruction pipeline 400 includes fetch control 500 which receives as inputs IFSIZ 214 and INT ADDR[1], the second least significant bit of INT ADDR 211. Fetch control 500 outputs FSIZ 408 and FREQ 410 to load/store unit 406. Fetch control 500 also controls multiplexer (MUX) 502 located in instruction buffer circuit 514. Instruction buffer circuit 514 also includes instruction decode register 504 and four 16-bit registers which hold the instructions loaded from INT DATA 212. Alternate embodiments may include more or less registers as needed, and the registers can be of any appropriate size, depending on the width of the instructions being accessed. Also, instruction pipeline 400 may provide a feed forwarding path (not shown) from INT DATA 212 directly to mux 502, thereby bypassing registers 506, 508, 510, and 512. The output of MUX 502 is provided to instruction decode register 504 which is then provided to control logic 402.

In operation, fetch control 500 determines where the instructions fetched from INT DATA 212 are placed within the instruction buffer circuit 514. For example, in the case of a 32-bit instruction prefetch request, two 16-bit instructions may be provided via INT DATA 212 to instruction buffer circuit 514. In this case, the two fetched instructions can be stored into a pair of registers within the instruction buffer circuit 514. For example, a first pair of instructions may be stored into register 0 512 and register 1 506, and a second pair of instructions, fetched during a subsequent access, may be stored into register 2 510 and register 3 508. The control signal of MUX 502 would therefore toggle in order to sequentially move the instruction from register 0 followed by the instruction from register 1 into instruction decode register 504. Instruction decode register 504 is also a 16-bit register which provides the data from registers 0 and 1 to control logic 402.

In the case of requesting a 16-bit instruction prefetch, in response to a previously captured value on IFSIZ 214 indicating a previous instruction prefetch access was performed to a 16-bit device, fetch control 500 provides the control signal to MUX 502 which selects the series of registers that receive the lower 16-bits of INT DATA 212, i.e. D[15:0]. For example, MUX 502 would select the lower input that corresponds to registers 0 and 2 since D [15:0] is an input to register 2. Therefore, by constantly selecting the input from register 0, MUX 502 continuously provides only the lower 16-bits of INT DATA 212 to instruction decode register 504 while accessing the 16-bit device. Instruction decode register 504 then provides these 16 bits to control logic 402. In this manner, only the lower 16 bits are accessed since the instructions were taken from a 16 bit device.

Alternate embodiments may have aligned the 16-bit instructions accessed from a 16-bit device differently, For example, BIU 204 may be designed to place the 16-bits from EXT ADDR 222 onto the higher 16-bits of INT DATA 212 (D[31:16]). In this case where the 16-bit instructions are aligned differently (such as to the upper 16-bits of INT DATA 212), fetch control 500 may instead control MUX 502 such that the input from register 1 is provided to instruction register 504 while accessing the 16-bit device. Alternate embodiments may align the 16 bits from the 16-bit device in different manners and provide different control logic to provide the proper 16 bits to control logic 402.

As illustrated in FIG. 4, control logic 402 contains a decode unit which decodes the received instructions from instruction decode register 504. Once decoded, control signals are provided to execution unit 404. In response to these control signals, execution unit 404 provides or receives the necessary data to or from load/store unit 406 required to execute the current instruction. These transfers are data transfers associated with memory operands stored external to CPU 202, and are not considered instruction fetches, thus the IFSIZ 214 signal has no effect on the size of the transfer requested by execution unit 404. Memory operands may be of varying width such as byte (8-bit), halfword (16-bit) or word (32-bit), or of larger than word such as doubleword (64-bit) as is well known in the data processing art. Regardless of the width of the memory device supporting these data operand transfers, Load/Store Unit 406 will receive or provide data equal to the size of the requested memory operand.

When performing instruction fetches however, instruction pipeline 400 receives IFSIZ 214 and INT ADDR[1] and generates FSIZ 408 and FREQ 410. IFSIZ 214 indicates the width of the accessed device when the previous instruction fetch was performed, while INT ADDR[1] allows instruction pipeline 400 to determine whether the address to be accessed next is odd or even halfword aligned. FSIZ 408 signal indicates to load/store unit 406 the size of the fetch that is to be performed and is generated according to the following logic table:

| IFSIZ | INT ADDR[1] | FSIZ |
|-------|-------------|----------|
| 0 | 0 | word |
| 0 | 1 | halfword |
| 1 | x | halfword |

In the above table, it is assumed that a negated IFSIZ and INT ADDR[1] indicates a word size (32 bits) for each signal and an asserted IFSIZ or INT ADDR[1] indicates a halfword size (16 bits) for each signal. Other embodiments may use negative logic, or indicate the sizes differently. Also, this embodiment assumes that the device being accessed is one of a 32 or 16 bit device; however alternate embodiments may differentiate between different sizes (such as 64 bits vs. 32 bits) or may even differentiate between more than just two sizes. For example, a two bit value may be used to indicate a doubleword, word, halfword, or byte. However, for ease of illustration, the signal in the above table distinguishes between 16 and 32 bits.

Referring to the above table, if IFSIZ 214 is negated (meaning the last instruction access was to a 32-bit device), and INT ADDR[1] (corresponding to the next address to be accessed) is also negated to indicate word alignment, then FSIZ 408 is cleared to indicate a word. If IFSIZ 214 is negated, (meaning the last instruction access was to a 32-bit device), and INT ADDR[1] is asserted, indicating an odd halfword alignment, then FSIZ 408 is set to indicate a halfword. However, if IFSIZ 214 is asserted, (meaning the last instruction access was to a 16-bit device), then INT ADDR[1] is a don't care, meaning regardless of its value, FSIZ 408 is set to indicate a halfword. This FSIZ 408 indication of a word or halfword is then used by load/store unit 406 to properly generate the next request. Thus, it can be appreciated that the instruction fetch size is controlled in part by the size of the memory device which responded to the previously requested instruction fetch.

FREQ 410 allows a next instruction fetch based upon the registers of instruction buffer circuit 514. That is, if the buffers are full, then FREQ 410 will not allow a next fetch. If the registers of instruction buffer circuit 514 have available space, then FREQ 410 will indicate to load/store unit 406 that more space is available. Therefore, assuming FREQ 410 indicates that space is available, load/store unit 406 initiates a next instruction fetch based upon FSIZ 408 received from instruction pipeline 400. For an instruction fetch, TSIZ 220 is generally set to the value of FSIZ 408 to indicate the number of instructions to be fetched. That is, if TSIZ 220 indicates a word (32 bits) then two 16-bit instructions will be fetched, and if TSIZ 220 indicates a halfword, only 16 bits (one instruction) will be fetched.

TREQ 216 initiates the next data transfer. TREQ 216 and TA 218 are handshaking signals used to control memory accesses. Also, load/store unit 406 uses FSIZ 408 and FREQ 410 received from instruction pipeline 400 to properly update INT ADDR 211 for each fetch. For example, during a series of word accesses, the address sent out on INT ADDR.211 is incremented by 4 prior to each access. However, in cases where FSIZ 408 indicates halfword accesses, load/store unit 406 increments the address sent out on INT ADDR 211 by 2 each time in order to access each 16 bit instruction.

Figure 6:
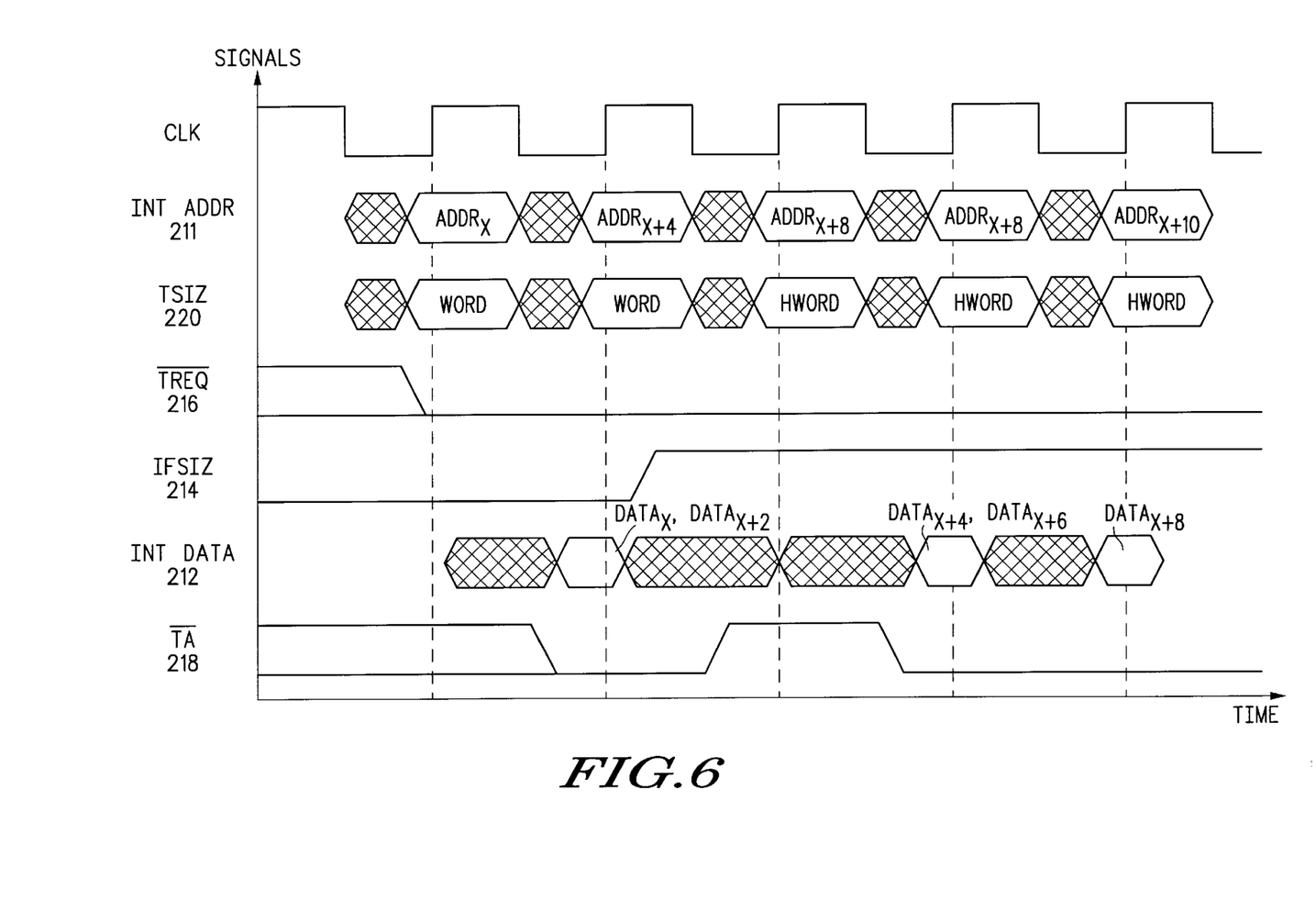
FIGS. 6–9 illustrate in timing diagram form, an instruction fetch according to one embodiment of the present invention.
Figure 7:
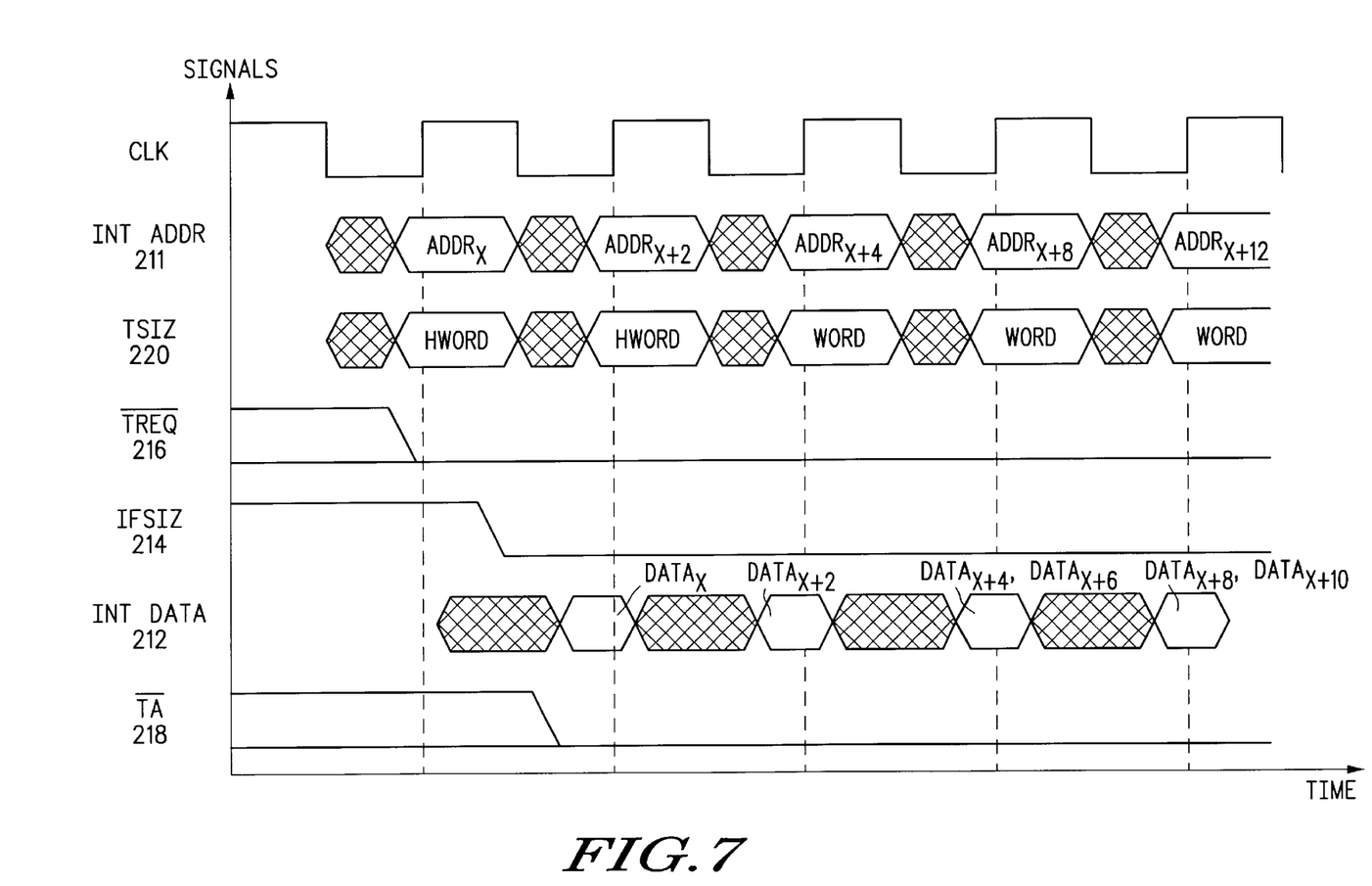
Figure 8:
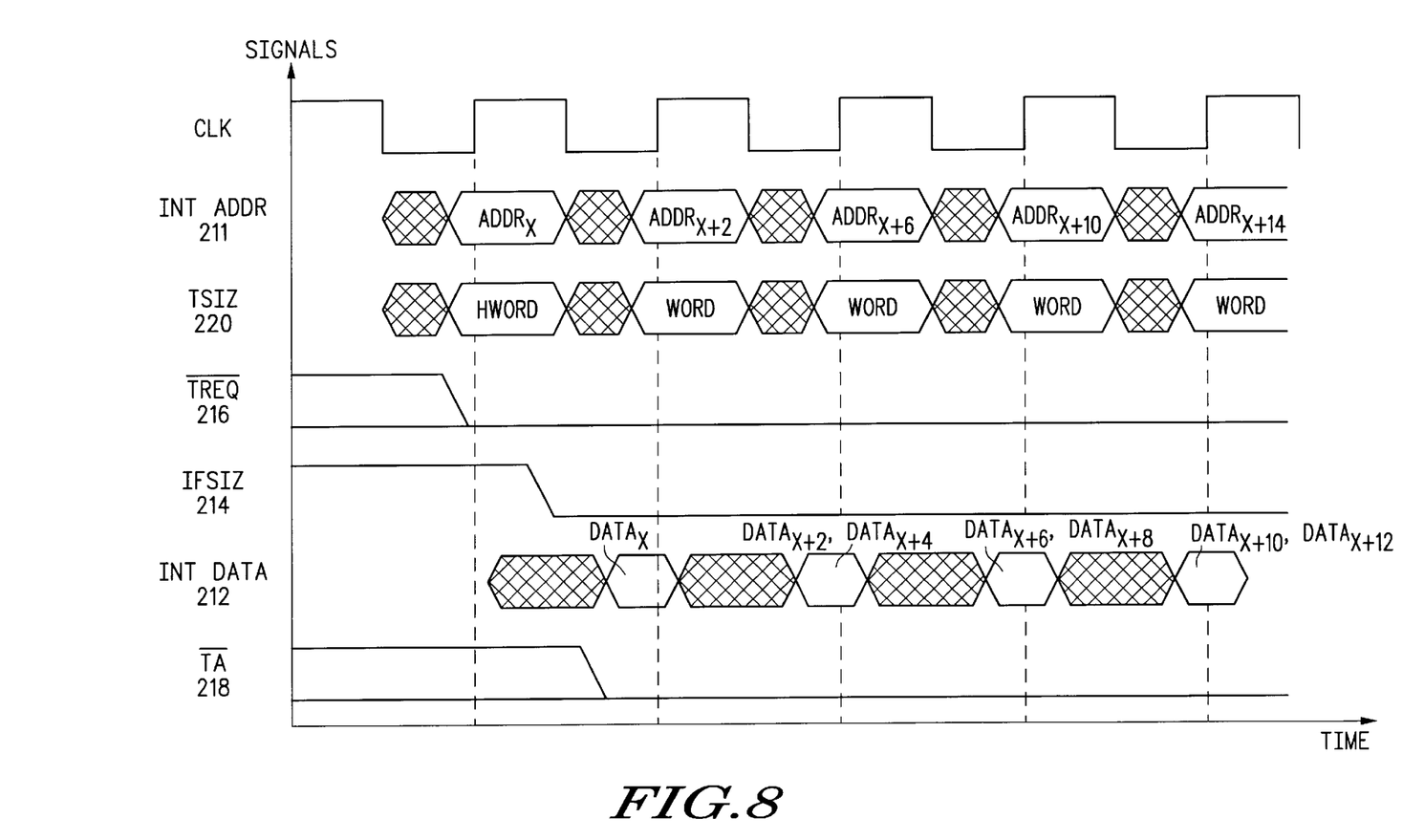

Operation of data processing IC 200 is further explained in reference to FIGS. 6, 7, and 8. IFSIZ 214, which was described in reference to FIGS. 2–5, is dynamically generated during operation of data processing IC 200. That is, during operation, instruction accesses to a 32-bit device may be followed by instruction accesses to a 16-bit device and vice versa. Therefore, data processing IC 200 should be capable of toggling between accesses to 32-bit devices and accesses to 16-bit devices. The use of IFSIZ 214 thus allows for efficient operation when accessing both 32 and 16 bit devices with a 32-bit bus. In alternate embodiments, IFSIZ 214 can be used to allow improved operation when accessing 64, 32, and 16 bit devices, or any combination of devices having different size ports.

FIG. 6 illustrates, in timing diagram form, the transition of performing 32 bit accesses, corresponding to two 16-bit instructions, to 16 bit accesses. Prior to IFSIZ 214 being asserted, the address on INT ADDR 211 is incremented by 4 each time in order to access 2 instructions (i.e. a full word) each time. Therefore, first address X is fetched during the first clock cycle of FIG. 6. Since IFSIZ 214 was not asserted during the previous instruction fetch (meaning a 32-bit device was previously accessed), a word access is requested to address X. That is, TSIZ 220, also shown in FIG. 6, indicates a word access. During the cycle address X is accessed, IFSIZ 214 remains negated, indicating that a 32-bit memory device is being accessed. Thus, during the next cycle, the address has been incremented by the load/store unit 406 to access the address 4 bytes later, address X+4 and another word access is requested. (Operation of load/store unit 406 in incrementing the address was also discussed above.) Once again TSIZ 220 indicates a word access. During this cycle, however, IFSIZ 214 is asserted to indicate that the current access is to a 16-bit device rather than a 32-bit device. The following access during the next cycle begins 4 bytes later at address X+8 since the last requested access (at address X+4) is already fetching a full word (4 bytes). However, for this next cycle, TSIZ 220 indicates a halfword, since the previous access to address X+4 was to a 16-bit device as indicated by the assertion of IFSIZ 214 during that cycle, and while IFSIZ 214 remains asserted, the address will be incremented by 2 bytes each time in order to fetch successive halfwords.

FIG. 6 also indicates a stall once address X+8 is accessed. The stall is indicated to CPU 202 by negating TA 218 (illustrated as TA with a bar over it in FIG. 6 to indicate that this signal is active low). Since TA 218 is active low, the high signal indicates that the transfer was not acknowledged. Therefore, once TA 218 is asserted (returns low), address X+8 is refetched. The stall occurs due to the fact that the word fetch to address X+4 initiated in the previous cycle is being performed on a 16-bit device since IFSIZ 214 was asserted during that same cycle. Therefore, since a full word access is being requested from a 16-bit device, 2 cycles are necessary to complete the access, thus causing a pipeline stall. TA 218 is therefore reasserted once both accesses to addresses X+4 and X+6 are complete, and the 16-bit device is ready to proceed with address X+8, followed by address X+10.

When transitioning from accessing a 16-bit device to a 32-bit device, the word alignment must be examined. This is due to that fact that accesses to the 32-bit device must be properly aligned. FIG. 7 illustrates, in timing diagram form, a 16-bit device to a 32-bit device transition during a word aligned instruction fetch (e.g. an even halfword aligned fetch). In this case, IFSIZ 214 is negated to indicate the transition to a 32-bit device. Since the transition occurred while accessing an even halfword of the 32-bit device (corresponding to the upper halfword of the full word), a second halfword access must be performed in order to access the odd halfword (the lower halfword of the full word) and realign the addresses to a word boundary, since the 32-bit device may only be capable of providing aligned word values. Therefore, the following cycle fetches address X+2 with TSIZ 220 continuing to indicate a halfword in order to align the addresses to a word boundary even though IFSIZ 214 was negated during the previous instruction fetch to address X. Once realigned to the proper word boundary, TSIZ 220 is updated to indicate a word access and the next address fetch begins with address X+4, which is a word aligned address. Therefore, so long as IFSIZ 214 remains negated, successive word accesses will occur and the address will be updated by 4 bytes each time, e.g. address X+8 and address X+12.

FIG. 8 also illustrates, in timing diagram form, a 16-bit to 32-bit device transition. However, this transition occurs during an odd halfword aligned fetch. That is, IFSIZ 214 is negated during an odd halfword access to address X. In this case, the next word to be fetched is already properly aligned to the even word boundary. Therefore, after the last halfword access from address X, the next access (at address X+2) can begin as a word access (indicated by TSIZ 220 indicating a word during the next cycle). While IFSIZ 214 remains negated, each fetch address will be incremented by 4 bytes in order to fetch 2 instructions each cycle, e.g. address X+6, address X+10, and address X+14.

FIGS. 6–8 illustrate sequences of instruction fetches. However, during normal operation of CPU 202, data operand accesses are interspersed with instruction fetches. Since data accesses correspond to operands associated with execution unit 404, they may be performed to a different memory device than the instruction fetches they are interspersed within, thus the size of the accessed memory device for these data fetches may be unrelated to size of the memory device which will be accessed for the next instruction fetch. To account for this fact, IFSIZ 214 can be ignored during data operand accesses, and the value associated with the latest previously performed instruction fetch is preserved for use in determining the next following instruction fetch request size. For example, an instruction fetch to address X may result in IFSIZ 214 being asserted, indicating a memory device size of 16-bits is responding. Following this access, Load/Store Unit 406 may request a data operand access associated with execution unit 404 to an unrelated memory access address Y. Following completion of the data operand access, an instruction fetch will be requested to address X+2 with a size of halfword, regardless of the value provided by IFSIZ 214 during the data operand access to address Y, since IFSIZ 214 was previously asserted (indicating a 16-bit memory device) during the previous instruction fetch to address X.

Also, when CPU 202 encounters an exceptional event and interrupts normal program execution to begin exception processing, the first instruction fetch to retrieve the initial instructions of an exception handler defaults to a word access request. This is because the performance of an exception handler may be critical and therefore is usually placed in an internal memory. These internal memories generally match the internal data bus thus supporting the full bandwidth allowed by data processing IC 200. However, alternate embodiments may be designed to not default to word accesses, depending on the design of each separate data processing system. For example, the exception handler may be located in an internal 16-bit memory or in an external memory.

Although examples have been given with INT DATA 212 being a 32-bit bus and with an external device (external memory 208) and EXT DATA 224 being 16-bits, this can be extended to any situation where the internal data bus differs from the external data bus or the access size of the device being accessed. For example, a data processing IC such as data processing. IC 200 may have a 64-bit data bus with a need to access 32-bit devices. In this case, embodiments of the present invention can be extended to improve instruction fetching in this case as well. An instruction may be 32 bits in this embodiment, and a word may be defined to be 64 bits rather than 32 bits. It should be appreciated that the advantages of the above embodiments can be applied to various different data processing IC's having to interface a data processor (such as CPU 202) with other memories or devices, especially with those having different size access ports.

Figure 9:
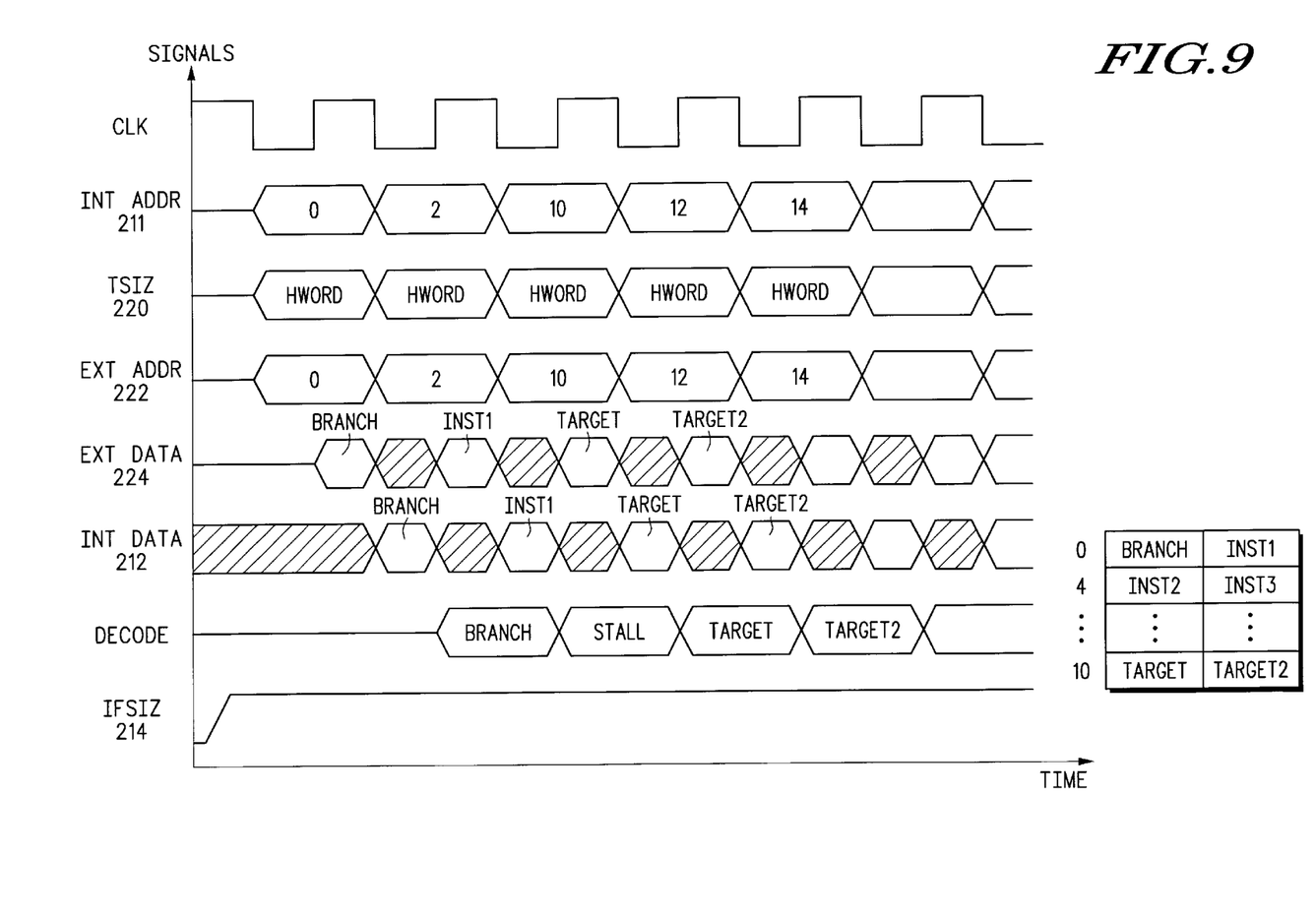

FIG. 9 illustrates the savings achieved by implementing embodiments of the present invention. For example, FIG. 9, as compared to FIG. 1, illustrates the reduction of pipeline stalls. FIG. 9 illustrates, in timing diagram form, instruction fetches using an internal 32-bit bus to access 16-bit instructions from a 16-bit device. Therefore, IFSIZ 214 is asserted to indicate access of a 16-bit device, and TSIZ 220 indicates a halfword in order to access 16-bits per cycle. In this embodiment, during the first cycle, address 0 is accessed from the device and placed on EXT ADDR 222. Rather than waiting for a full 32 bits to be accessed, the instruction corresponding to address 0 (which in this case is a branch instruction, as illustrated in the table of FIG. 9) is placed immediately on EXT DATA 224 which is then fed back to INT DATA 212 via BIU 204 (see FIG. 2). CPU 202 does not wait to complete both accesses of addresses 0 and 2 prior to receiving the instruction corresponding to address 0. In this manner, address 2 is accessed while the branch instruction has already entered the decode stage within CPU 202. That is, address 2 is accessed and instruction 1 (corresponding to address 2, as shown in FIG. 9) is placed on EXT DATA 224 while the branch instruction (the previous halfword) is in the decode stage.

Once the branch is decoded and the target address is generated during the decode stage, the next access following address 2 immediately corresponds to the target address which in this example is located at address 10. Thus, CPU 202 does not wait for the access of both addresses 0 and 2 to occur prior to decoding the branch. (Accesses to address 12 and 14 then follow, assuming that another change of flow is not encountered at addresses 10 and 12.)

In contrast the timing diagram of FIG. 1 illustrates that decoding of the branch instruction begins after the receipt of both the instructions at addresses 0 and 2 since the prior art system requests a pair of instructions to be fetched to optimize usage of the internal bus bandwidth. Consequently, the access of addresses 4 and 6 has already begun prior to the generation of the target instruction address. Therefore, the fetches of instructions 2 and 3 (corresponding to addresses 4 and 6) must be completed prior to accessing the instruction located at the target address.

Stall 1 of FIG. 1 occurs before decoding the branch instruction because both addresses 0 and 2 must be fetched prior to placing them on INT DATA. As described above, stall 2 of FIG. 1 occurs because the fetch of address 6 cannot be interrupted once the fetch of address 4 is initiated. Therefore, stall 2 is in effect waiting for the unnecessary fetch of address 6, which cannot be stopped. Stall 3 of FIG. 1 occurs due to the fetch of the target instruction after having decoded the branch and generated the target address. Termination of the access of address 6 must be completed prior to fetching the target address even though the target address was previously generated while the branch was in the decode stage. Furthermore, since two instructions must be fetched during each access (corresponding to the fact that a 32-bit request was made by prior art CPU), both addresses 10 (corresponding to the target instruction) and 12 (corresponding to target 2, the instruction following the target instruction) must be fetched prior to placing them on INT DATA. Therefore, stall 4 in FIG. 1 occurs because a second fetch must occur to receive the instruction at address 12 once the target fetch is initiated and prior to placing the instructions on INT DATA. Only at this point can the target instruction be decoded.

As illustrated in FIG. 1, the prior art has introduced four different pipeline stalls in the decode stage because two instructions must be accessed during each cycle prior to returning any data to the CPU. However, the only stall introduced in FIG. 9 corresponds to the fetch of the target instruction which cannot begin until after the target address is generated while the branch is in the decode stage. Therefore the prior art of FIG. 1 introduces three more stall stages than the embodiments described in FIGS. 2–9. These embodiments allow for 16-bit accesses to occur thus providing to CPU 202 the necessary data after each 16-bit access as opposed to waiting for the full 32-bit accesses. This is accomplished by dynamically updating a signal such as IFSIZ 214 during operation of data processing IC 200 to indicate transitions from 16-bit to 32-bit devices and vice versa. Therefore, it can be appreciated how the use of a signal such as IFSIZ 214 to indicate different access sizes improves efficiency by changing an instruction fetch policy of CPU 202 to address accesses from 16-bit devices differently from accesses from 32-bit devices.

Furthermore, although FIG. 1 illustrates that each external address fetch requires one clock cycle, some slower devices, such as external memories, may require more than one clock cycle to perform each address fetch. In this case, each pipeline stall corresponds to even greater inefficiencies, since the latency added by the pipeline stalls is not simply one clock cycle per extra address fetched, but a multiple thereof. Therefore, the slower the devices get, the greater the latency introduced by the unnecessary stalls. Therefore, the savings offered by the embodiments described in reference to FIGS. 2–9 become increasingly important as many of the devices being accessed by CPU 202 are slower external 16-bit memories.

In the foregoing specification, the invention has been described with reference to specific embodiments. However, one of ordinary skill in the art appreciates that various modifications and changes can be made without departing from the scope of the present invention as set forth in the claims below. For example, the numbers used herein to indicate addresses are in decimal (base ten) form; however, these can be represented in hexadecimal (base sixteen) form, binary (base two) form, or in any other appropriate form. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processor to execute instructions, the data processor to fetch instructions from a memory according to a fetch size, the data processor comprising:

a first input to receive instructions;

control logic to decode the instructions; and an instruction pipeline coupled to the first input and the control logic, the instruction pipeline, responsive to a first signal, to set the fetch size to one of a first size and a second size.

2. A data processor according to claim 1 wherein the instruction pipeline comprises:

a fetch control circuit having a second input to receive the first signal; and an instruction buffer circuit coupled to the fetch control circuit and the control logic, the instruction buffer circuit to hold instructions.

3. A data processor according to claim 2 wherein the instruction buffer circuit comprises:

a plurality of registers coupled to the first input;

a multiplexer coupled to the plurality of registers; and an instruction decode register coupled to the multiplexer and the control logic.

4. A data processor according to claim 2 wherein the instruction buffer circuit is selectively configurable to the fetch size.

5. A data processor according to claim 1 wherein the first size differs from the second size.

6. A data processing integrated circuit (IC) comprising:

a first memory comprising instructions; and a data processor having a first input and a second input, the first input coupled to the first memory, the second input to receive a size signal, the data processor, responsive to the size signal, to fetch the instructions from the first memory according to one of a first fetch size and a second fetch size.

7. A data processing IC according to claim 6 further comprising a bus interface unit, the bus interface unit having a first output to provide the size signal, the first output coupled to the second input of the data processor.

8. A data processing IC according to claim 7 wherein the data processor has a second output, the second output to provide an address signal, and the bus interface unit further comprises a third input coupled to the second output, the bus interface unit, responsive to the address signal, setting the size signal to correspond to the first fetch size or the second fetch size.

9. A data processing IC according to claim 8 wherein the bus interface unit further comprises a control register coupled to the first output, the control register comprising a size selection control bit, and the size signal derived from the size selection control bit.

10. A data processing IC according to claim 8 further comprising a first bus coupled to the first input, the first bus having a first width; and wherein the bus interface unit further comprises a fourth input and a fifth input, the fourth input coupled to the first bus, the fifth input coupled to receive instructions from a second memory via a second bus, the second bus having a second width.

11. A data processing IC according to claim 10 wherein the first width is different from the second width.

12. A data processing IC according to claim 11 wherein the first width is 32 bits and the second width is 16 bits.

13. A data processing IC according to claim 6 wherein the first fetch size differs from the second fetch size.

14. A method of fetching instructions in a data processor, the method comprising:

setting a fetch size to a first size;

fetching instructions according to the fetch size;

receiving a size signal; and selectively updating the fetch size to a second size in response to the size signal, wherein
selectively updating further comprises:
evaluating an address signal;
evaluating the size signal; and
updating the fetch size when the address signal indicates an alignment corresponding to the second size.

15. A method according to claim 14 wherein updating further comprises setting the fetch size to word.

16. A method according to claim 14 wherein fetching instructions further comprises:

setting the fetch size to the first size when fetching instructions from a first memory; and setting fetch size to a second size when fetching instructions from a second memory.

17. A method according to claim 14 wherein the first size differs from the second size.

* * * * *